Aug. 11, 1931.  A. R. THOMPSON  1,818,109
COMBINED COOKER AND COOLER CAN TRANSFER MEANS—NONAGITATING TYPE
Filed April 18, 1928
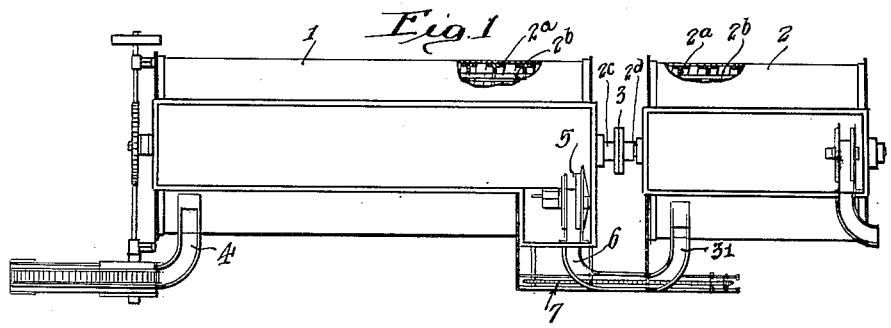
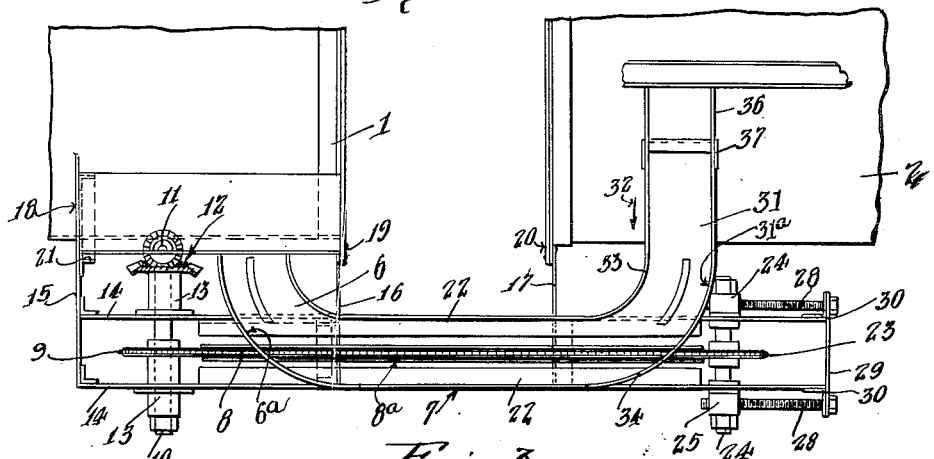
Inventor
Albert R. Thompson
By Lyon & Lyon
Attorneys Patented Aug. 11, 1931

1,818,109

UNITED STATES PATENT OFFICE

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA

COMBINED COOKER AND COOLER CAN TRANSFER MEANS—NON-AGITATING TYPE

Application filed April 18, 1928. Serial No. 271,071.

This invention relates to combined heat treating apparatus for canned goods and is more particularly related to a mechanism for transferring cans from one heat treating chamber to another, or from what is known in the art as a "cooker" to what is known as a "cooler", to reverse the cans end for end in the respective chambers to equalize the wear on the cans and the scarring of the ends of the same and which transfer means is constructed to, and functions to cause a minimum of agitation of the cans in the transferring of the same from the respective chambers.

In transfer means heretofore provided for transferring cans from one heat treating chamber to the next which include a relatively long runway between the chambers the cans in passing over this relatively long runway have been accelerated in their travel to such an extent that they obtain sufficient momentum which is not materially slackened when the cans are diverted into the second chamber. The result is that the cans are materially scarred and dented in passing into the second chamber.

An object of this invention is therefore to provide a transfer means before a pair of chambers which includes a relatively short conveyor to which the cans are delivered through an inclined curved chute. The cans pass through the inclined curved chute and engage against the chute at their ends thus retarding the speed of travel of the cans. The chute is relatively short and the conveyor is operated in timed relation with the relatively slow speed of the cans delivered to it. The cans also being delivered from the conveyor through a second inclined curved gravity chute which also engages the can ends retards their speed of travel and gently feeds the cans into the second chamber. The conveyor or chain of the transfer means stops the rolling of the cans as they pass on to the conveyor from the first inclined curved chute and delivers the cans with a minimum of momentum to the second curved inclined chute. The curvature of the chutes acts through the tendency of the cans to throw outward in passing therethrough as a friction brake against the ends of the cans.

Another object of this invention is to provide a transfer means for transferring cans between chambers that include a gravity runway for delivering cans to a driven conveyor and a second gravity runway for conveying cans from the driven conveyor to the second chamber. The transfer means operates to retard the speed of travel of the cans and deliver the cans into the second chamber at a relatively low rate of speed, and insures continuous substantially uniform speed of travel of the cans in passing through the runway substantially equal to the speed at which the cans are caused to pass in the chambers.

Another object of this invention is to provide a transfer means for transferring cans from one chamber to another in a manner to cause a minimum of agitation of the contents of the can in passing from one chamber to the other and which mechanism includes a means of any suitable or desirable construction for extracting the cans from one heat treating chamber and delivering the same to a relatively short driven conveyor by means of which the cans are transferred to an inclined chute having a minimum of drop between its respective ends and through which the cans travel by gravity into a second treating chamber.

Another object of this invention is to provide a transfer means for transferring cans from one treating chamber to another, which includes a relatively short conveyor on to which the cans are delivered from one chamber and from which conveyor the cans are delivered to another chamber, the cans in passing through the respective delivery means and over the conveyor being reversed end for end in the respective chambers.

Other objects and advantages of this invention it is believed will be apparent from the following detailed description of a preferred embodiment thereof as illustrated in the accompanying drawings:

In the drawings:

Figure 1 is a plan view of a combined cooker and cooler illustrating transfer means as embodying this invention as interposed between the cooker and cooler.

Figure 2 is an enlarged top plan view of the transfer means embodying this invention.

Figure 3 is an end view thereof.

Figure 4 is a fragmental end view thereof.

Figure 5 is a front elevation of the conveyor means embodied in this invention.

In the preferred embodiment of this invention illustrated in the accompanying drawings, 1 indicates a heat treating chamber which is herein illustrated as of the form which is commonly known in the art as a cooker. Operatively connected with the cooker 1 is a second treating chamber, which is illustrated as of the type known as a cooler, 2. The drive shafts of the cooker 1 and cooler 2 are coupled together as illustrated at 3. The cooker 1 and cooler 2 may be of any suitable or desirable construction as is well understood in the art, and preferably comprise substantially cylindrical shells having spiral canways $2^a$ formed on their inner periphery through which the cans are caused to travel by means of reels $2^b$ operatively connected with the driving shafts $2^c$ and $2^d$ of the cooker and cooler. This type of construction of cooker and cooler is well understood in the art so that applicant has not deemed it necessary to particularly illustrate and describe the same in this application.

The cans containing the goods to be treated are preferably hermetically sealed prior to their introduction into the cooker 1 through the inlet 4.

The cans are discharged from the cooker 1 by means of an extractor mechanism 5, one form of the construction of which is particularly illustrated and described in my copending application, Serial No. 271,070, filed April 18, 1928. The cans as the same are extracted from the cooker 1, pass by gravity down an inclined guideway 6 to the conveyor 7. The curved chute 6 may be of any suitable or desirable construction as, for example, illustrated in my copending application above referred to.

The conveyor 7 may be of any suitable or desirable form of construction and is herein illustrated as including a chain 8 driven by a sprocket 9. The sprocket 9 is secured to a shaft 10, and the shaft 10 is driven from the shaft 11 through the gears 12. The shaft 11 may be driven from any suitable or desirable source and it is not deemed necessary to particularly illustrate a means for driving this shaft 11 as any suitable form of power means may be employed. A channel iron $8^a$ is mounted in position between the angle members 22 to guide and support the chain 8. A shaft 10 is journaled in bearings 13, which are secured to the side plates 14 of the guideway through which the chain 8 travels. The side plates 14 are secured to brace plates 15, 16 and 17 secured to the shell of the cooker 1 as illustrated at 18 and 19, and to the shell of the cooler 2 as illustrated at 20. The plates 15, 16 and 17 are secured to the side plates 14 by means of angle irons 21. Secured to the inner adjacent faces of the side plates 14 are angle irons 22 which form a track over which the cans travel.

The chain 8, at its opposite end, is trained over a sprocket 23 which is journaled on a shaft 24. The shaft 24 is journaled in bearings 25 which are slidably supported in slots 26 formed in the side plates 14. Screw-threaded in bosses 27 formed on the bearings 25 are take-up screws 28. The take-up screws 28 are journaled in holes formed through an end plate 29 and angle irons 30. The angle irons 30 secure the end plate 29 to the side plates 14. By taking up on the screws 28 the desired tension may be maintained in the chain 8.

A curved inclined chute 31 is connected with the transfer means just in advance of the sprocket 23 and is inclined as illustrated at 32 so that the cans as they are delivered onto the chute 31 from the track formed by the angle irons 22 roll by gravity into the cooler 2. The chute 31 is of relatively short length and is of only slight incline so that the cans obtain a relatively slow speed in rolling by gravity down the chute 31 into the cooler 2. The chute 31 is formed by curving the inner adjacent side plate 14 inwardly as illustrated at 33 and the outer side plate 14 as illustrated at 34, the plates 14 being cut off on a level with the angle irons 22 prior to the bending of the same to form the curved transfer means to the chute 31.

A bottom plate 35 is secured at one end to the shell of the cooler 2 and at its opposite end to the inner angle iron 22. The plates 14 are secured to the respective ends of the plates 36 of the inlet trough of the cooler 2 as illustrated at 37.

The operation of the transferring means embodying my invention is:

The cans are positively extracted from the chamber 1 by means of the extractor mechanism 5. The cans are delivered by the extractor mechanism 5 to the inclined curved chute 6 and roll down the chute 6 with their ends in engagement with the outer wall $6^a$ thereof. The engagement of the ends of the cans with the outer wall $6^a$ causes the speed of the cans to be materially slackened. The cans then pass onto the conveyor and are driven by the chain 8. The cans are stopped rolling by the chain 8 and are driven along by said chain continuously at a rate of speed substantially equal to the rate of speed of the travel of the cans in the chambers 1 and 2. The cans leave the conveyor and travel down the inclined curved chute 31 where their speed of travel is again controlled by the engagement of the can ends with the wall $31^a$ of the chute 31 by the tendency of the cans to throw outwardly by centrifugal force against said wall $31^a$, the result being that the cans are fed into the chamber 2 at uniform speed, and at such speed that they are not dented or scarred when coming into contact with the canway $2^a$ or reel $2^b$ of the chamber 2. The cans are fed by this means continuously into the chamber 2 at approximately the speed of travel of the cans through the chamber 2.

Having fully described my invention, it is to be understood that I do not wish to be limited to the details herein set forth, but my invention is of the full scope of the appended claims.

I claim:

1. In a device of the class described the combination of a pair of treating chambers, means for transferring cans from one chamber to the other, including a relatively short driven conveyor over which the cans travel from one chamber to the other and during which transfer the cans are reversed end for end in traveling from one chamber to the other.

2. In a device of the class described the combination of a pair of heat treating chambers for canned goods, a relatively short driven conveyor between said chambers, means for delivering cans to the conveyor, and an inclined curved chute leading from the conveyor and down which the cans are caused to travel by gravity into the second of said chambers, the inclined chute having a relatively small drop so that the cans are eased into the second chamber and the cans being turned end for end in traveling from one chamber to another to equalize wear on the ends of the cans.

3. In a device of the class described the combination of a pair of side plates providing a can track between a pair of heat treating chambers, brackets secured to the end of said chambers for supporting the side plates, sprockets secured to the ends of side plates, a chain trained over the sprockets intermediate the flanges, means for driving one of the said sprockets, a take-up mechanism operably connected with the other of said sprockets, an inclined gravity runway leading from one of said chambers to the track and an inclined gravity runway leading to the other of said chambers from the track so that the cans are reversed end for end in passing from one chamber to the other.

4. In a device of the class described, a plurality of treating chambers, a reel and spiral canway in each chamber, means for positively diverting cans from the pockets of the first canway into a curved gravity chute, a traveling conveyor to receive the cans from said chute and advance them toward the second chamber, and means for guidingly sweeping the cans from the conveyor into a second chute to feed them into the second chamber.

5. In a device of the class described, a pair of treating chambers, means for transferring cans from one of said chambers to the other, including an inclined runway to receive the cans from the first chamber, an inclined runway to deliver cans to the next chamber, and driven means interposed between and communicating with said runways to facilitate the travel of cans from one chamber to the next.

Signed at San Jose, Calif., this 29th day of March, 1928.

ALBERT R. THOMPSON.